Dec. 21, 1937.  F. K. CLAR  2,103,061
BRAKE SYSTEM FOR TRAINS
Filed Jan. 18, 1937  2 Sheets-Sheet 1

INVENTOR.
FRIEDRICH K. CLAR
BY Richards & Geier
ATTORNEYS

Dec. 21, 1937.   F. K. CLAR   2,103,061
BRAKE SYSTEM FOR TRAINS
Filed Jan. 18, 1937   2 Sheets-Sheet 2
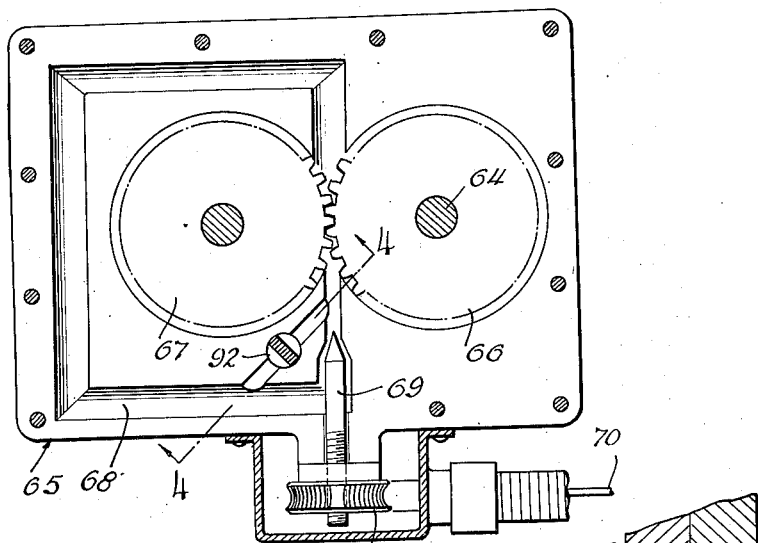
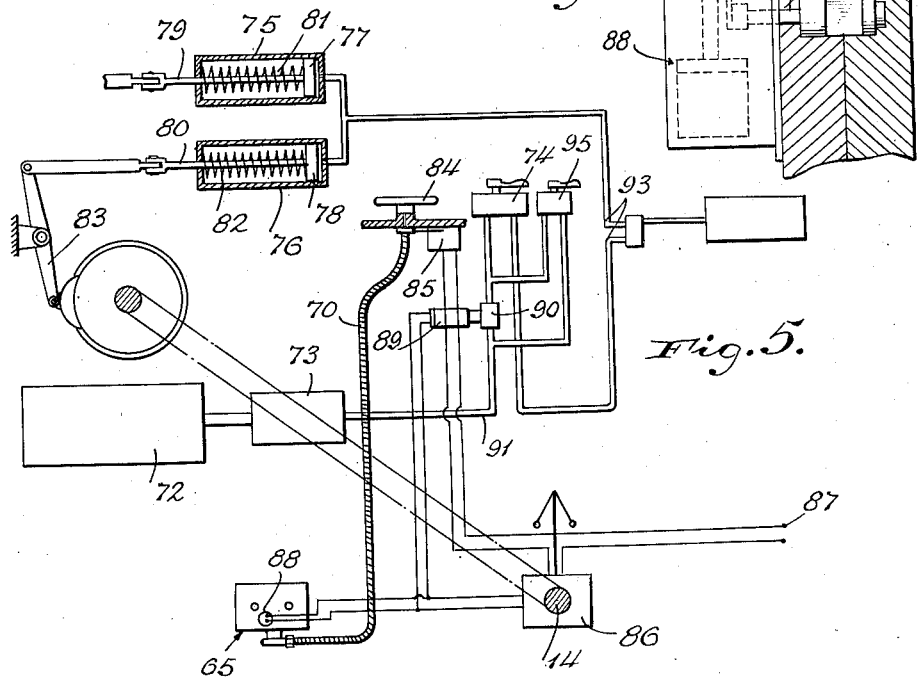
INVENTOR.
FRIEDRICH K. CLAR
BY
Richards & Geier
ATTORNEYS Patented Dec. 21, 1937

2,103,061

UNITED STATES PATENT OFFICE 2,103,061

BRAKE SYSTEM FOR TRAINS

Friedrich Konrad Clar, Berlin-Hermsdorf, Germany, assignor to Rheinmetall-Borsig Aktiengesellschaft/Werk Borsig Berlin-Tegel, Berlin-Tegel, Germany, a corporation of Germany, and Carl Geissen, Berlin-Schoneberg, Germany Application January 18, 1937, Serial No. 121,072
In Germany January 20, 1936

5 Claims. (Cl. 188—2)

This invention relates to a brake system for trains, and refers more particularly to brakes used on locomotives, cars and other vehicles for the purpose of bringing them to a stop.

Heretofore, trains were often provided with frictional brakes operated by compressed air. It was found, however, that the brake lining of such brakes is rubbed off very quickly, particularly when brakes are applied at high speeds, with the result that the lining very frequently must be removed and replaced by a new one.

An object of the present invention is the provision of a braking system which would bring a train driven at high speeds quickly and effectively to a stop, and which at the same time would preserve the brake lining and eliminate the rapid deterioration of the brakes.

The present invention is based upon the discovery that frictional brakes are particularly suitable for trains driven at comparatively low speeds, while fluid or hydraulic brakes are particularly adaptable for higher speeds.

The above and other objects of the present invention may be realized through the provision of a braking system comprising a hydraulic brake and a frictional brake, as well as means which insure that only the hydraulic brake is in operation when the train is moving at higher speeds, and that only the frictional brake is in operation when the train is moving at a comparatively low speed.

Frictional brakes used in the system constructed in accordance with the principles of the present invention may be of standard type. The hydraulic brakes may cooperate with a disc firmly connected with the axle of the vehicle and rotatable therewith. A number of rollers are pressed against the disc and rotated by it. The rotation of these rollers may be transmitted to a gear pump which causes the circulation of a fluid in an annular closed conduit system. A throttle valve may be provided in that system, this throttle valve being operated in the course of the braking period to diminish to a predetermined extent the cross-sectional area of the passage for the circulating liquid. By means of this throttle valve it is possible to provide a braking effect which is transmitted by the rollers to the disc.

It is advantageous to provide automatically operable means for switching over from a hydraulic brake to a frictional brake while the train is being slowed down. These means may be constructed in such manner that their action will depend upon the speed of the train or the fluid pressure of the hydraulic brake.

The system constructed in accordance with the principles of the present invention may be operated by first switching on the hydraulic brake. At that time the train is running at a high speed. The hydraulic brake will diminish the speed of the train until a certain predetermined velocity is reached. Then the device automatically switches off the hydraulic brake and switches on the frictional brake which continues to carry out its braking action until the train is brought to a stop.

The invention will appear more clearly from the following detailed description when taken in connection with the accompanying drawings showing, by way of example, a preferred embodiment of the inventive idea.

In the drawings:

Figure 3 is a sectional view of the hydraulic gear pump.

Figure 4 is a section along the line 4—4 of Figure 3.

Figure 5 is a schematic view of an air brake system.

Figure 1:
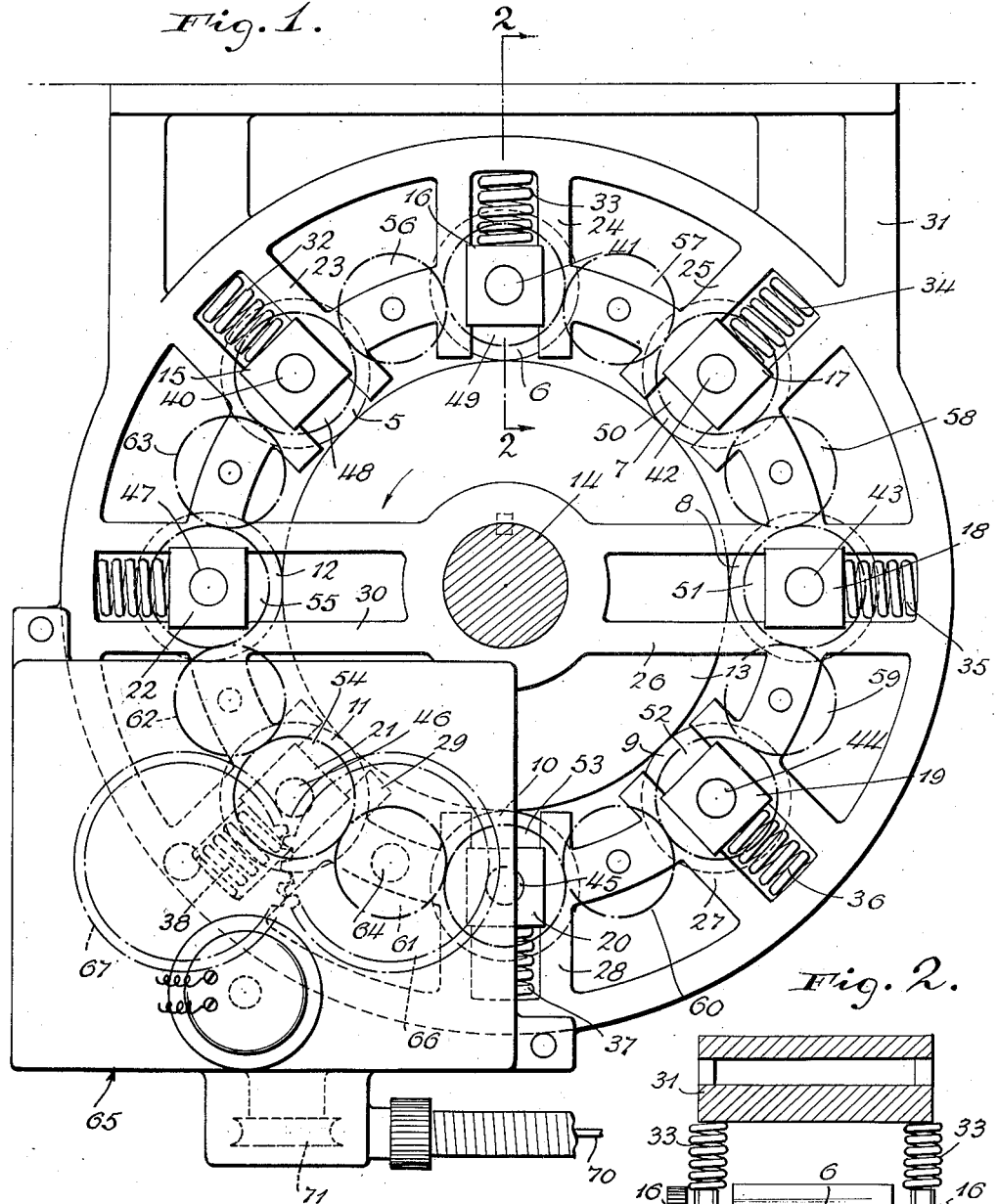
Figure 1 shows a hydraulic brake constructed in accordance with the principles of the present invention.
Figure 2:
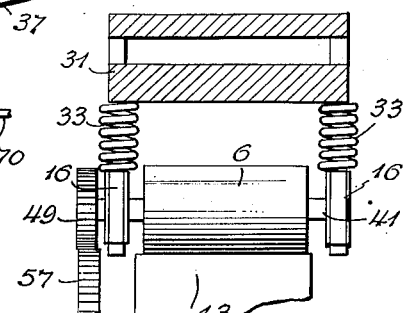
Figure 2 is a section along the line 2—2 of Figure 1.

The brake system illustrated in the drawings comprises the rollers 5 to 12, surrounding a disc 13 which is firmly connected and rotatable along with the axle 14 of a vehicle. The rollers 5 to 12 are mounted in slides 15 to 22 which are movable along guides 23 to 30, respectively. The guides 23 to 30 constitute a part of a frame 31 which is fixed to the wheel truck or any other suitable stationary part of the vehicle.

The springs 32 to 39 press the guides 23 to 30 in a direction toward the center of the axle 14 with the result that the rollers 5 to 12 are pressed against the disc 13 and are rotated by this disc. The roller shafts 40 to 47 of the rollers 5 to 12 are firmly connected with the gears 48 to 55, respectively, which mesh with the intermediate idler gears 56 to 63. Due to this arrangement a continuous gear train is formed between all rollers 5 to 12.

The gear 61 is mounted on the shaft 64 of the hydraulic gear pump 65 which is shown in greater detail in Figures 3 and 4 of the drawings.

The gear pump 65 comprises a wheel 66 mounted on the shaft 64 and meshing with a wheel 67. The liquid situated within the interior of the pump 65 is circulated through a closed annular passage or conduit 68. A valve 69 is mounted in the passage 68 and is used to vary the operative cross-sectional area of the passage 68. The valve 69 is operated from the engineer's cab (not shown) by means of worm gears 71 and a flexible cable 70 connected with a hand wheel 84. (Figure 5.)

It is apparent that when the valve 69 restricts the passage of the liquid through the conduit 68, a force is created which opposes the rotation of the gear wheels 66 and 67. This force is transmitted to the rollers 5 to 12 through the continuous gear train with the result that the free rotation of the rollers will be prevented and that they will have a braking effect upon the disc 13, thereby diminishing the speed of the vehicle.

Figure 5 is a schematic view of an air brake or frictional brake system comprising a compressor 72 connected with a reservoir 73 which is connected by means of a pipe 91 with a control valve 74. The device comprises two air cylinders 75 and 76 containing pistons 77 and 78, which are connected with rods 79 and 80 and are in contact with springs 81 and 82, respectively. The piston rods 79 and 80 are connected to brake beams 83, one of which is shown in the drawings, said brake beams actuating the frictional braking mechanism of the usual type.

The hand wheel 84 is also connected with a switch 85 which is electrically connected with a centrifugal switch 86 mounted on the wheel axle 14. The switch 86 is supplied with electrical energy from a source 87 and is connected with a solenoid 88 situated within the pump 65, and another solenoid 89 actuating an air valve 90 situated within the conduit 91 which connects the reservoir 73 with the control valve 74.

The solenoid 88 is operatively connected with a by-pass valve 92 which is adapted to release the pressure in the passage 68 of the pump 65 (Figures 3 and 4).

The device is operated as follows:

In order to apply the brakes to the car axle the operator turns the hand wheel 84 (Figure 5). The movement of the hand wheel 84 will be transmitted to the valve 69 (Figure 3) by means of the cable 70 and the worm gears 71. The valve 69 by restricting the passage 68 will create pressure within the passage 68 which will cause the gears 66, 67, 56 to 63 and 48 to 55 (Figure 1) to rotate more slowly, so that due to friction between the rollers 5 to 12 and the disc carried by the axle 14, the rotation of the disc 13 will be retarded.

At the same time the hand wheel 84 will actuate the switch 85 (Figure 5) by means of the contact 84' movable along with the wheel 84, closing the circuit of the centrifugal switch 86. The frictional forces between the rollers 5 to 12 and the disc 13 will gradually diminish the speed with which the vehicle is moving. The centrifugal switch 86 is so set that it will operate only at a predetermined speed which is lower than the original speed of the vehicle. When that lower speed is reached, the switch 86 will energize the solenoids 88 and 89.

The solenoid 88, when energized, will actuate the by-pass valve 92 (Figures 3 and 4), thereby releasing the pressure of the liquid in the passage 68 and thus releasing the braking action of the rollers 5 to 12 upon the disc 13.

At the same time the solenoid 89 (Figure 5) will open the air valve 90, thereby enabling compressed air to flow from the reservoir 73 and through the pipe 91, the control valve 74 and the pipe system 93 into the cylinders 75 and 76. Compressed air will move the pistons 77 and 78 against the action of the springs 81 and 82, so that the piston rods 79 and 80 will actuate the brake beams 83 and apply the frictional brakes to the axle 14.

The control valve 74 is operated by hand and is opened before the described action takes place.

Since the valve 90 is normally closed, the device is provided with a hand operated emergency valve 95 which shunts the valve 90.

By means of the described construction each of the two brakes, i. e. the hydraulic brake and the frictional brake, is applied to that range of speeds for which it is particularly suitable, and for which its use is most economic and effective.

What is claimed is:

1. A braking system for trains, comprising in combination, a hydraulic brake, a frictional brake, and automatically operable means for applying said hydraulic brake only while the train is traveling at a high speed and for switching off said hydraulic brake and applying said frictional brake when the speed of said train has diminished to a predeterminable extent.

2. A braking system for trains, comprising the combination of a vehicle axle with a hydraulic brake, a frictional brake, and automatically operable means for applying said hydraulic brake to said axle while the train is traveling at a high speed and switching off said hydraulic brake and applying said frictional brake when the speed of said train has diminished and has reached a predeterminable speed.

3. A braking system for trains, comprising in combination, a hydraulic brake, a frictional brake, automatically operable means for applying said hydraulic brake only while the train is traveling at a high speed and for switching off said hydraulic brake and applying said frictional brake when the speed of said train has diminished to a predeterminable extent, and means the action of which is dependent upon the speed of the train, for actuating the first-mentioned means.

4. A braking system for trains, comprising in combination, a hydraulic brake, a frictional brake, automatically operable means for applying said hydraulic brake only while the train is traveling at a high speed and for switching off said hydraulic brake and applying said frictional brake when the speed of said train has diminished to a predeterminable extent, said hydraulic brake comprising means for circulating a fluid; and means operated by the pressure of said fluid for actuating the first-mentioned means.

5. A braking system for trains, comprising in combination with a vehicle axle; a disc mounted upon said axle, and rotatable therewith, a plurality of rollers which are in engagement within said disc and which are rotated thereby, means pressing said rollers against said disc, means interconnecting said rollers, a hydraulic gear pump operatively connected with the second-mentioned means and comprising means constituting a closed conduit system for the circulation of a fluid; a throttle valve in said conduit system, manually operable means connected with said throttle valve for actuating the same, said throttle valve being adapted to increase the pressure of said fluid in said conduit system, whereby the friction between said rollers and said disc is increased, so that said rollers exert a braking action upon said disc, a frictional brake adapted to engage said axle, and automatic means connected with said frictional brake and said pump for decreasing the pressure of said fluid in said conduit system when the speed of the vehicle has been diminished to a predeterminable extent and simultaneously causing said frictional brake to engage said axle to continue the braking action thereon.

F. K. CLAR.